US012585834B2

(12) United States Patent
Dos Santos et al.

(10) Patent No.: US 12,585,834 B2
(45) Date of Patent: Mar. 24, 2026

(54) EXECUTION OF AN OPERATION IN A SECURE ELEMENT

(71) Applicant: IDEMIA FRANCE, Courbevoie (FR)

(72) Inventors: Elder Dos Santos, Courbevoie (FR);
Dragan Vujcic, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 69 days.

(21) Appl. No.: 18/690,074

(22) PCT Filed: Sep. 6, 2022

(86) PCT No.: PCT/EP2022/074771
§ 371 (c)(1),
(2) Date: Mar. 7, 2024

(87) PCT Pub. No.: WO2023/036788
PCT Pub. Date: Mar. 16, 2023

(65) Prior Publication Data
US 2024/0427946 A1 Dec. 26, 2024

(30) Foreign Application Priority Data

Sep. 9, 2021 (FR) ..................................... 21 09437

(51) Int. Cl.
*G06F 21/86* (2013.01)
(52) U.S. Cl.
CPC ..................................... *G06F 21/86* (2013.01)
(58) Field of Classification Search
CPC ...... G06F 21/86; G06F 11/3419; G06F 21/72; G06F 21/71; G06F 21/57; G06F 21/74; G06F 21/31
See application file for complete search history.

(56) References Cited

U.S. PATENT DOCUMENTS 7,281,101 B2 * 10/2007 Mizushima ............. G06F 21/78
711/163
8,366,007 B2 * 2/2013 Tanabiki ................. G06F 21/77
235/487

(Continued)

FOREIGN PATENT DOCUMENTS

CN 112214291 A 1/2021

OTHER PUBLICATIONS

International Search report & Written Opinion issued Nov. 8, 2022 in PCT/EP2022/074771, filed on Sep. 6, 2022, 9 pages.

(Continued)

*Primary Examiner* — Hosuk Song
(74) *Attorney, Agent, or Firm* — Oblon, McClelland, Maier & Neustadt, L.L.P.

(57) ABSTRACT

The present invention relates to the management of the execution of resource-intensive operations within a secure element. The operation is formed of a plurality of elementary operations. In order to prevent the operation from monopolizing resources over a long period while high responsiveness of the secure element is sought, in particular in 5G-related technologies, provision is made, upon receipt of an APDU command from a host equipment, to trigger a time counter in order to determine an actual processing duration to process the APDU command. If this duration proves to be less than a predefined duration allocated to the APDU command, one or more of said elementary operations may be executed during the remaining time of said allocated duration. Upon expiry of this allocated duration, the secure element sends a response to the APDU command. The operation may thus be executed gradually without preventing the secure element from being highly responsive to received APDU commands.

12 Claims, 4 Drawing Sheets

(56) References Cited

U.S. PATENT DOCUMENTS

| | | | |
|---|---|---|---|
| 8,646,041 B2 * | 2/2014 | Urien | H04L 9/321 |
| | | | 713/150 |
| 11,100,081 B2 * | 8/2021 | Dumoulin | H04W 8/20 |
| 11,863,684 B2 * | 1/2024 | Lu | H04L 9/3226 |
| 11,907,931 B2 * | 2/2024 | Zhang | G06Q 20/327 |
| 12,073,394 B2 * | 8/2024 | Dicker | G06Q 20/10 |
| 12,075,236 B2 * | 8/2024 | Caserta | G06F 21/6245 |
| 12,170,726 B2 * | 12/2024 | Dupuy | G06F 21/602 |

OTHER PUBLICATIONS

French Preliminary Search Report & Written Opinion issued Apr. 13, 2022 in FR Application 21 09437, filed on Sep. 9, 2021, 13 pages (with English translation of categories of Cited Documents).

* cited by examiner

300 a. Receive
APDU command

305 b. Trigger a
time counter

310

Execute
APDU command

315

Compute actual
execution duration

320 c. Available time
sufficient?

no yes

325 d. Execute one or
more elementary
operations

330 e. Send APDU
response

EXECUTION OF AN OPERATION IN A SECURE ELEMENT

TECHNICAL FIELD

The present invention relates in general to the field of secure elements, and more particularly to the management of the execution of tasks or computing operations, such as cryptographic processing operations, in secure elements.

PRIOR ART

ETSI (the European Telecommunications Standards Institute) is currently working on the technical specifications for $5^{th}$ generation (5G) networks.

5G makes provision in particular for each subscriber to a given service of a communication network, for example radio or Wi-Fi (trademark), to have a 5G identifier unique in the world, denoted SUPI (Subscriber Permanent Identifier), embedded in a secure element of SIM (Subscriber Identity Module) card type.

This subscriber identifier includes for example the IMSI (International Mobile Subscriber Identity), which is a unique identifier allocated to each mobile subscriber of a GSM (2G), UMTS (3G) or LTE (4G) mobile network, or the NAI (Network Access Identifier) introduced by RFC 4282.

In order to improve security, the technical specification ETSI TS 133 501 V15.1.0 (2018-07) makes provision to authenticate the subscriber using this unique identifier on multiple occasions, in particular during the process of authentication and key exchange between a host user equipment—and more particularly the secure element inserted or soldered therein—and the network, that is to say upon each connection to the network.

More particularly, the specification recommends to encrypt this identifier on elliptic curves before sending to the network.

It is possible, for example during personalization of the secure element of the host user equipment, to provide a set of pre-encrypted identifiers to be used for these authentications, and thus to connect to the network. However, the memory of the secure element is limited, and it is not possible to provide a sufficient number of already encrypted identifiers for all of the connections that will take place.

The secure element therefore necessarily regularly has to encrypt the identifier "on the fly". However, such an encryption operation, carried out using software, is costly in terms of computing resources, especially given that it is carried out frequently. It therefore hogs resources for a long time.

The encryption operation is just one example of operations that are costly in terms of computing resources. Periodic memory cleaning operations, known as garbage collectors, also consume large amounts of processing resources.

Generally speaking, a secure element is confronted with numerous operations that hog processing resources for long periods.

This immobilization of the resources of the secure element greatly reduces the responsiveness of the secure element to requests from the host user equipment or from the mobile telephony network. This situation is therefore not suitable for 5G, which aims to address the increased needs of complex applications requiring high responsiveness.

There is therefore a need to improve the management of this type of operation within secure elements.

SUMMARY OF THE INVENTION

The present invention thus aims to overcome at least one of the abovementioned drawbacks.

In this context, a first aspect of the invention relates to a method for managing the execution of a main operation by a secure element, the method being characterized in that:

the main operation is formed of a plurality of elementary operations, and the method comprises the following steps:
- a. receiving, from a host equipment, a command in the Application Protocol Data Unit, APDU, format,
- b. triggering a time counter when the APDU command is executed in order to determine an actual processing duration for the secure element to process the APDU command;
- c. determining whether the actual processing duration indicated by the time counter is less than a predefined duration associated with the APDU command; and
- d. in the event of a positive determination, executing one or more of said elementary operations during the remaining time of said predefined duration.

In correlation, a second aspect of the invention relates to a secure element configured to execute a main operation formed of a plurality of elementary operations, the secure element comprising a processor configured to:
- a. receive, from a host equipment, a command in the Application Protocol Data Unit, APDU, format,
- b. trigger a time counter when the APDU command is executed in order to determine an actual processing duration for the secure element to process the APDU command;
- c. determine whether the actual processing duration indicated by the time counter is less than a predefined duration associated with the APDU command; and
- d. in the event of a positive determination, execute one or more of said elementary operations during the remaining time of said predefined duration.

The invention thus claimed makes it possible to improve the management of the operations implemented within secure elements.

Indeed, the main operation, which for example consumes large amounts of processing resources, is carried out in parts during the time remaining after the execution of the received APDU command.

Therefore, the main operation may be carried out in several goes during a plurality of iterations of executing successive APDU commands, without having prevented the implementation of other processing operations (APDU commands) before the end of the main operation.

The invention thus restores a high degree of responsiveness of the secure element.

Still according to the invention, the method furthermore comprises a step e. of sending a response to the APDU command to the host equipment, after step d.

In one particular embodiment, the response to the command is sent upon expiry of the predefined duration associated with the APDU command.

By controlling the time of sending of the APDU response to the host equipment, the secure element artificially extends the time allocated to the processing of the APDU command in order to allow elementary operations to be executed at the end of this processing. This allocated time corresponds to the predefined duration associated with the APDU command.

This controlled extension also has security advantages. Indeed, it makes it possible to modify (and therefore conceal) the real time of processing or execution of an APDU command, seen from outside the secure element, because this time is conventionally defined between the sending of the command and the receipt of the response thereto. The processing performance of the secure element is therefore not disclosed; a malicious person is no longer able to identify the processing that is actually implemented.

Other features of the method and of the secure element according to some embodiments of the invention are described in the dependent claims.

In another embodiment, the time counter is triggered upon receipt of the APDU command. This makes it possible to monitor the execution time of the APDU command as seen from outside the secure element, in order for example to comply more easily with standardized maximum durations. Of course, as a variant, it could be triggered at the same time as the execution of the APDU command by the secure element, after receipt thereof.

In another embodiment, the method comprises a plurality of iterations of steps a. to d. so as to execute said plurality of elementary operations forming the main operation. All of the elementary operations may be executed during the time remaining after the execution of multiple successive APDU commands.

As a variant, some of the elementary operations may however be executed by the secure element between the management of two successive APDU commands. In particular, the method may comprise, after sending a response to a received APDU command and before receiving a following APDU command, additionally executing one or more of said elementary operations. Therefore, as soon as the secure element is no longer occupied by APDU commands, it is able to progress the execution of the elementary operations making up the main operations to be performed.

In one particular embodiment, the additional execution of one or more of said elementary operations comprises successively executing one or more elementary operations until the following APDU command is received. In other words, the secure element executes elementary operations for as long as no new APDU command that it has to process is received. In that case, it stops processing the elementary operations, and processes the received new APDU command in line with steps a. to d. above.

In one embodiment, the main operation is predivided into said plurality of elementary operations, each being associated with an elementary processing duration, and step d. comprises selecting the one or more of said elementary operations to be executed on the basis of their associated elementary processing durations and said remaining time.

In this embodiment, the elementary operations are known in advance and therefore predefined, with their associated costs (theoretical processing durations). When remaining time proves to be available after execution of an APDU command, the secure element may then pick, preferably in a logical order, elementary operations that it is able to execute during this remaining time, taking into account the temporal cost of each elementary operation.

This enables the "simultaneous" execution of multiple main operations. In this case, step d. may comprise executing at least two elementary operations originating from at least two distinct main operations. Indeed, the secure element is able to pick elementary operations from multiple main operations in order to optimize the use of the time remaining after execution of the APDU command.

In an embodiment other than that of dividing the main operation (which consumes large amounts of resources), step d. comprises continuing to execute the main operation from a previous suspension point (initially the start of the operation), said execution of the main operation being suspended at a following suspension point that depends on the remaining time.

In this case, the main operation is not divided a priori, but is executed gradually by continuing to execute it with successive suspensions. This execution is therefore resumed at the end of the execution of the APDU command, for the remaining time, and is then suspended again at the end of the remaining time, preferably at a suspension point that does not compromise the overall execution of the main operation.

Therefore, what is referred to as the "previous" suspension point in a new iteration of steps a. to d. may be what is referred to as the "following" suspension point resulting from the last iteration of steps a. to d. Of course, if the secure element were to execute part of the main operation between the processing of two APDU commands, the "previous" suspension point in a new iteration of steps a. to d. would be the point where this execution would have been stopped upon receipt of the new APDU command to be processed.

The advantages, aims and particular features of the secure element are similar to those of the abovementioned method. A system may comprise the secure element and a host equipment for said secure element.

In one particular embodiment, the various steps of the abovementioned method are determined by computer program instructions.

Consequently, the invention also targets a non-transient computer-readable medium storing a computer program that, when it is executed by a secure element equipped with a processor, causes the secure element to perform the method as defined above.

This program may use any programming language, and take the form of source code, object code, or intermediate code between source code and object code, such as in a partially compiled form, or in any other desirable form.

The information medium may be any entity or device capable of storing the program. For example, the medium may comprise a storage means, such as a ROM, for example a microcircuit ROM, or else a magnetic recording means, for example a hard drive, or else a flash memory.

As an alternative, the information medium may be an integrated circuit in which the program is incorporated, the circuit being designed to execute or to be used in the execution of the method in question.

BRIEF DESCRIPTION OF THE DRAWINGS

Other particular features and advantages of the invention will become more clearly apparent from the following description, which is illustrated by the appended figures, which illustrate some non-limiting exemplary embodiments thereof.

DETAILED DESCRIPTION

A secure element, SE, is a tamper-proof hardware component or platform (typically a chip or a chip card) used in a host device or terminal (typically a mobile terminal) and capable of hosting, securely under the control of a card operating system, applications and data in compliance with security rules and requirements set by trusted authorities. Secure elements are used in particular for cryptographic processing operations for identification, authentication, signature, etc. purposes.

One widely used form factor of the SE is the embedded or integrated secure element, eSE (embedded Secure Element). This embedded secure element is generally soldered to the host terminal.

Secure elements are programmed according to the desired applications.

By way of example, an eSE may form the secure element necessary for numerous uses or services based on NFC (Near-Field Communication) communication implemented by a host mobile terminal. For example, an NFC payment service requires secret banking information from the user, which is advantageously stored in the eSE, protected from any unwanted access. This is also the case for a public transport service, where the eSE makes it possible to identify the user at access gates.

Another example of a secure element is the embedded UICC (Universal Integrated Circuit Card), which provides the credentials of a subscriber to authenticate themselves on a mobile telephony network. For example, this is an eSE configured as a SIM (Subscriber Identity Module) card. Reference is then made to an eUICC (embedded Universal Integrated Circuit Card).

Figure 1:
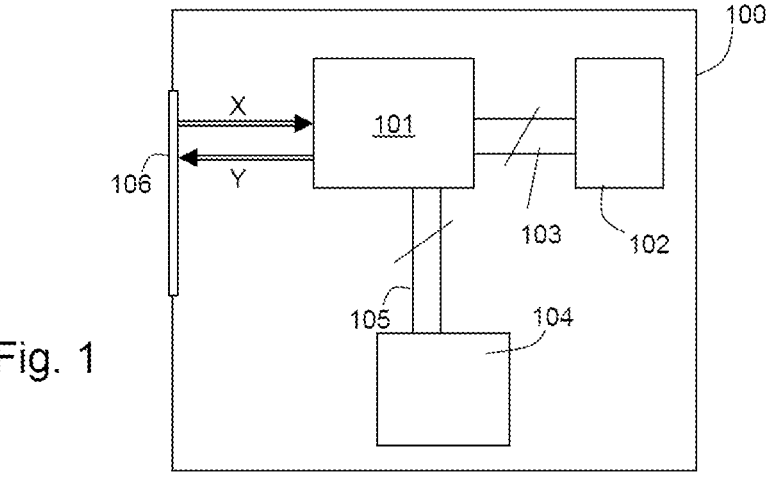
FIG. 1 schematically shows a secure element in which the present invention may be implemented.

FIG. 1 schematically shows a secure element 100 in which the present invention may be implemented. This secure element 100 comprises a microprocessor 101 having associated with it, on the one hand, one or more random access memories (RAM) 102, for example by way of a bus 103, and, on the other hand, one or more non-volatile memories 104 (for example of ROM (Read-Only Memory) and/or EEPROM (Electrically Erasable Programmable Read-Only Memory) and/or flash type), for example via a bus 105. The non-volatile storage memory 104 stores data and software intended to implement the invention, but also any data necessary for the execution of programs. The volatile working memory 102 stores the executable code of the computer programs along with registers designed to record variables and parameters necessary for their execution.

The buses 103 and 105 may be one and the same bus. The microprocessor 101 may be a secure cryptoprocessor.

The secure element 100 furthermore comprises, connected to the one or more buses, one or more communication interfaces 106 for communication with the host terminal (not shown) embedding the secure element.

The communication interface 106 is implemented for example by way of contacts provided on the secure element (typically a chip card) compliant with the ISO 7816 standard and/or by way of a (contactless) radiofrequency antenna compliant with the ISO 14443 standard.

The secure element 100 communicates, via the communication interface 106, with a card reader (compliant with the ISO 7816 and/or 14443 standard) with which the host terminal is equipped, typically in a master-slave scheme where the reader is master. Therefore, the reader of the host terminal sends a command X, typically in the APDU (Application Protocol Data Unit) format, and receives in return a response Y, typically in the APDU format, which is the result of executing the command X. Such a command is hereinafter referred to as "APDU command".

An APDU command is also known as an APDU instruction due to the presence of an instruction code "INS" in the command.

In practice, the reader may send a new APDU command only after having received a response to the previous APDU command.

The secure element 100 may be an eSE (embedded SE), an eUICC (embedded Universal Integrated Circuit Card), an eSIM (embedded SIM), intended to be integrated, by soldering for example, into a host terminal such as a smartphone, a digital tablet, a laptop, a personal assistant, an entertainment device (for example games console).

Figure 2:
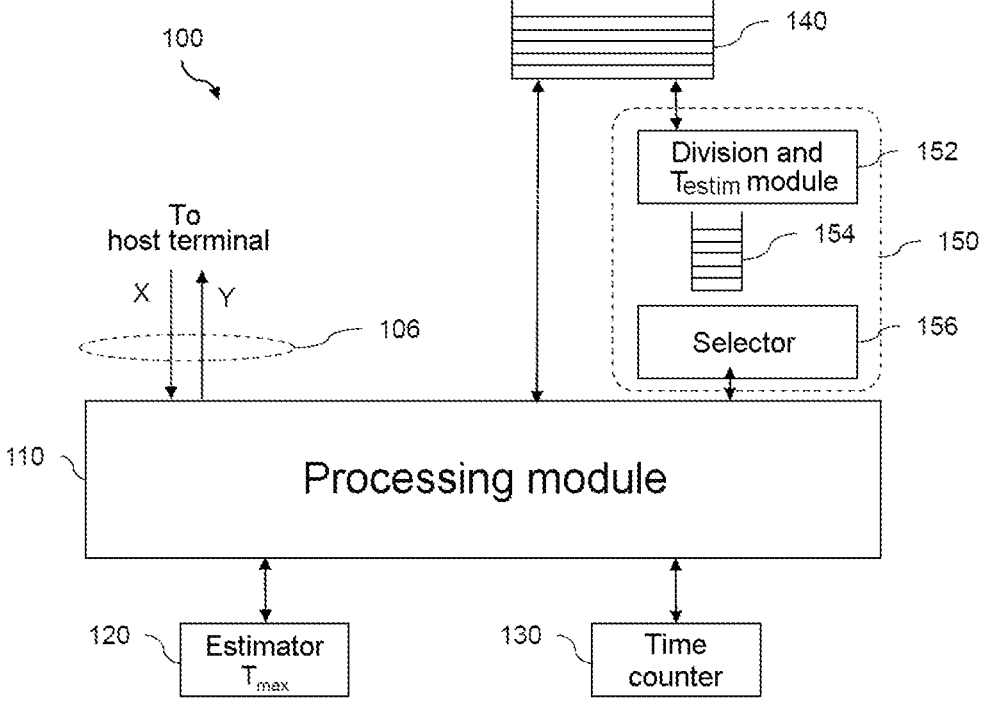
FIG. 2 schematically illustrates functional modules of the secure element for implementing the invention.

FIG. 2 schematically illustrates functional modules of the secure element 100 for implementing the invention. Of course, there may be additional functions, not shown, as will become apparent from the following description.

The secure element 100 comprises a processing or execution module 110, a duration estimator 120 for estimating a duration allocated per APDU command, a time counter 130, a task/main operation stack or buffer 140 and optionally a subtask or "elementary operation" manager 150. This manager 150 comprises a processing time estimation and division module 152, an elementary operation stack or buffer 154 and an elementary operation selector 156. A stack or buffer is a memory area that temporarily stores data. It may be of FIFO (first in, first out) type.

The processing or execution module 110 controls a method for managing the execution of a main operation stored in the stack 140 according to the invention. Typically, it may implement the operations of FIG. 3 described below.

The processing module 110 is connected to the communication interface 106 in order to receive APDU commands X from the host terminal, to execute these commands and to provide APDU responses Y in return.

The processing module 110 may call on the duration estimator 120 in order to obtain a duration allocated for a received APDU command X.

The duration estimator 120 may simply comprise a lookup table associating an allocated duration $T_{max}$ with an APDU command or a type of APDU command. By way of example, one and the same allocated duration $T_{max}$ may be provided for all APDU commands. As a variant, a different allocated duration $T_{max}$ may be defined for each type of APDU command, typically by an instruction code "INS" (18 different codes are defined in part 3 of the ISO/IEC 7816 standard, for example "read binary", "read record", "write binary", "open channel", "select file", "external authenticate", etc.). Of course, other definitions of "type of APDU command" may be envisaged, such as for example the four different APDU command structures (short format, write-oriented format, read-oriented format, full format).

The allocated duration $T_{max}$ may be defined in relation to a maximum response time defined in the ISO/IEC 7816 standard (see for example section 10.5.3.2 of the ISO/IEC 7816-3 standard). $T_{max}$ may be equal to this maximum response time or to a percentage thereof, for example 70% or 80%. The percentage may vary from one type of APDU command to another, or even from one APDU command to another.

As a variant, the allocated duration $T_{max}$ may be computed from an average execution time of an APDU command, a type of APDU command or all APDU commands. $T_{max}$ may be equal to this average response time plus a percentage, for example 10%, 15%, 20%, 25% or even 50%. The percentage may vary from one type of APDU command to another, or even from one APDU command to another. The average time may be determined beforehand or during the life of the secure element.

The duration estimator 120 may also comprise a learning submodule intended to adjust or update the allocated duration $T_{max}$ over time, in particular on the basis of the actual execution durations of the APDU commands that the secure element 100 executes. The learning is carried out with the same granularity as the assignment of the allocated durations to the APDU commands, namely per APDU command, per type of APDU command or globally for all APDU commands.

One of the durations $T_{max}$ defined above may be used as initial duration.

An average of the actual execution durations (possibly including the initial duration) plus a percentage, for example 10%, 15%, 20%, 25% or even 50%, may define the allocated duration $T_{max}$ for the following APDU command (or the type of APDU command, or all APDU commands). As a variant to using the average, the maximum actual execution duration may be used (depending on the granularity chosen).

The allocated durations $T_{max}$ may be updated upon each processed APDU command X, or after a predefined number of processed APDU commands (which are possibly identical or of the same type), or periodically.

This learning makes it possible to "profile" the estimator 120 to the characteristics of the secure element 100.

As a variant to autonomous learning, the allocated durations $T_{max}$ may be updated (periodically or on demand) by remote transfer (over-the-air or OTA), in particular when the host terminal is a mobile communication terminal, or by way of a file loaded directly by the host terminal into the secure element 100.

The processing module 110 may call on the time counter 130 in order to measure the actual execution or processing duration of a received APDU command X.

The time counter 130 is typically connected to the clock line CLK of the secure element, which is generally provided by the host terminal.

The time counter 130 may be triggered upon receipt of a new APDU command X. As a variant, it may be triggered only when the processing module 110 starts to read the command (therefore the header "CLA", "INS", "P1" and "P2" followed by the body "Lc", "DATA", "Le").

The time counter 130 is stopped when the execution result is obtained by the processing module 110 or when the APDU response Y is ready to be transmitted. In both cases, the APDU response Y has not yet been transmitted to the host terminal.

As described hereinafter, the duration measured by the time counter 130 enables the processing module 110 to easily ascertain whether there is still processing time available in view of the duration $T_{max}$ allocated to the processed APDU command. This available time makes it possible to partially progress the execution of a main operation stored in the buffer 140.

As described above, this measured duration also makes it possible, in some embodiments, to update the duration $T_{max}$ allocated to this APDU command (or to a particular type of command, or even to all APDU commands).

The buffer 140 is a memory area in which the secure element 100 stores operations that it wishes to carry out when processing resources are available. Typically, a routine of the secure element 100 stores operations that consume large amounts of resources therein.

By way of example, the generation of encrypted identifiers, for example SUPI or IMSI, monopolizes the microprocessor 101 for a long period. A pool of encrypted identifiers (in line with conventional techniques) may be present in the secure element 100 in order to facilitate authentication operations with a mobile communication network. Any encrypted identifier that is used is removed from the pool. A routine may then be sure that the pool contains at least N encrypted identifiers at all times. Therefore, when this number drops to N, the routine may launch an operation of generating M new encrypted identifiers. This operation is recorded in the buffer 140. Similarly, encryption, decryption, signature, etc. operations may be made up of multiple elementary operations.

In another example, the for example periodic garbage collector (GC) operations, responsible for recycling memory that is allocated beforehand and then unused, may be indicated in the buffer 140.

These "main" operations, as they are referred to, are generally made up of a plurality of elementary tasks or operations. For example, the encryption of an identifier is a piecewise or blockwise encryption operation: the encryption of each block making up the identifier may be likened to an elementary operation. Similarly, the garbage collector may process the memory in blocks or areas: cleaning each area making up the memory to be cleaned may be likened to an elementary operation. More generally, a main operation is a series of operations or steps that are able to be carried out gradually.

In particular, a pre-emptive execution environment (in the secure element) is capable of suspending the execution of an operation and of resuming it later. This suspension may for example be carried out at the border of each elementary operation or step constituting the main operation. More generally, suspension points may be identified in these main operations where the execution may be interrupted and suspended without damaging the execution as a whole (in particular without impacting the final result of the execution). The suspension may optionally require the recording of an execution environment (registers, parameters or intermediate values).

The elementary operation manager 150 may therefore, using the processing time estimation and division module 152, convert a main operation from the buffer 140 into a plurality of elementary operations to be executed. In the above examples, this in particular involves defining multiple elementary operations for the encryption of all blocks of an identifier to be encrypted, or defining multiple elementary operations for the cleaning of all memory areas.

The module 152 also estimates a processing time necessary for each obtained elementary operation. Similarly to the module 120, a lookup table may be provided, which associates a time $T_{estim}$ with each elementary operation (or type of elementary operation). A default time may be provided for any operation that is not referenced. Learning over time may make it possible to refine these times, or even to define them for operations that are not initially referenced. In this case, the time counter 130 may be used to compute the actual execution duration of each elementary operation.

This learning makes it possible to "profile" the estimator 152 to the characteristics of the secure element 100.

Depending on the techniques for dividing the main operation, the elementary operations may have different sizes (in the sense of the amount of processing needed) and therefore be associated with different estimated processing durations $T_{estim}$.

The elementary operation buffer 154 stores these elementary operations to be executed, with their associated estimated time $T_{estim}$. Preferably, it stores them in a logical execution order corresponding to their order in the main operation. This may be necessary if some elementary operations use the result of previous elementary operations. To guarantee that the selection of the elementary operations complies with this order, the buffer 154 may be of FIFO (first in, first out) type. One FIFO may be provided per main operation in case of a plurality of such main operations.

In one embodiment, the buffer 154 simultaneously stores elementary operations of two or more main operations. This allows the gradual execution of multiple main operations to be carried out simultaneously.

The processing module 110 may then call on the elementary operation selector 156 to choose which elementary operations to execute when processing time is available, in one implementation of the invention.

Typically, the processing module 110 indicates to the selector 156 an available time $T_{avail}$. The selector 156 may thus select elementary operations on the basis of their own estimated times $T_{estim}$ and of the available time $T_{avail}$.

If the allocated time $T_{max}$ comprises the sending time $T_{send}$ to send the APDU response Y, the available time $T_{avail}$ is reduced by this time $T_{send}$ before the elementary operations are selected. The sending time $T_{send}$ may, as a variant, be negligible.

Typically, the selector 156 selects a maximum number of elementary operations for which the sum of the corresponding estimated processing times does not exceed the available time: $sum(T_{estim}) \leq T_{avail}$.

In a selection operation for an available time $T_{avail}$, the selector 156 may select elementary operations associated with a single main operation. As a variant, the selector 156 may select elementary operations associated with a second main operation only if there is no further elementary operation to be executed for a first main operation. As another variant, the selector 156 may select elementary operations associated with two or more main operations.

The selector 156 may comply with the order of the elementary operations in the one or more main operations, and thus select only the one or more first elements (elementary operations) in the one or more FIFO buffers.

The main operations may optionally be associated with priorities. The selector 156 may then select the maximum number of elementary operations of the main operation having the highest priority that satisfy $T_{avail}$, and then select the maximum number of elementary operations of the following main operation having the highest priority that satisfy the remaining time ($T_{avail}$ minus the time estimated for elementary operations that have already been selected), and so on.

Figure 3:
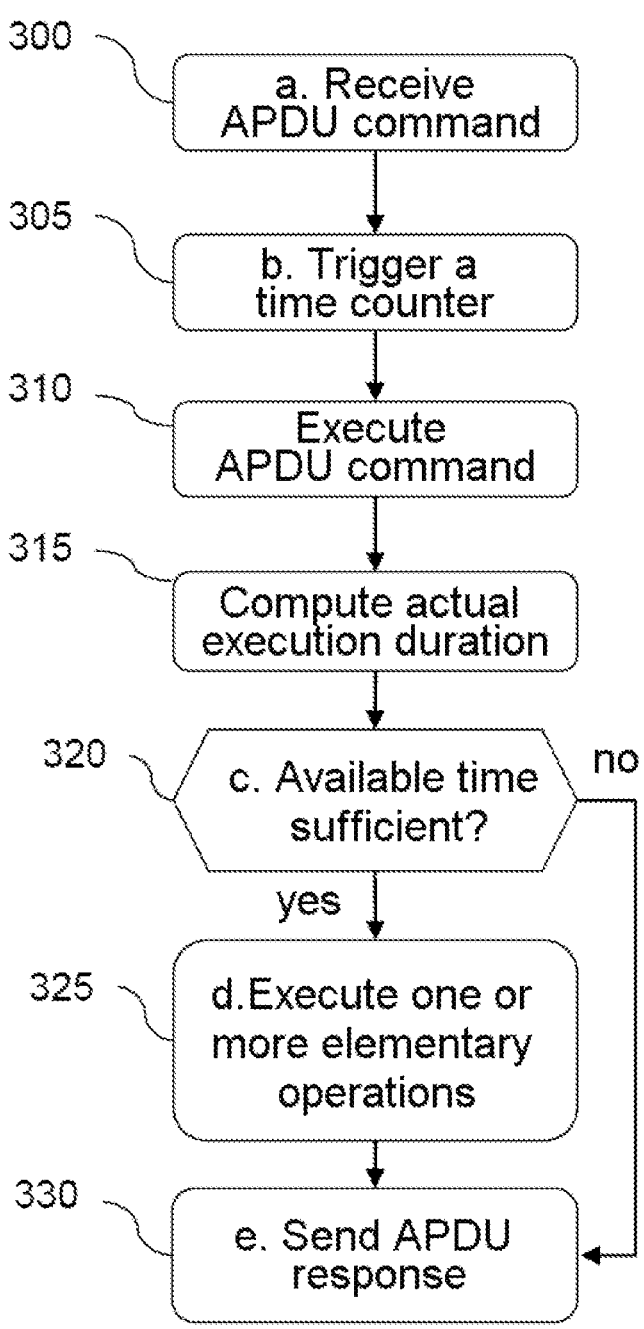
FIG. 3 illustrates, with the aid of a flowchart, general steps of a method according to the invention.

FIG. 3 illustrates, with the aid of a flowchart, general steps of a method according to the invention. These steps are controlled by the processing module 110.

In step 300, the processing module 110 receives an APDU command X from the host terminal.

In step 305, the processing module 110 triggers the time counter 130 when the APDU command is executed in order to determine an actual processing duration to process the APDU command. As indicated above, this triggering may be in response to the receipt 300 of the APDU command or be concomitant with the start of the execution 310 of the APDU command.

In step 310, the processing module 110 executes the APDU command X according to conventional mechanisms. For example, for a "read binary" command, this involves reading bytes from a file in memory. For a "write binary" command, this involves writing bytes to a file in memory.

The execution of the APDU command ends when the requested operation has been carried out and the result (for example write operation performed or bytes read) has been obtained, and optionally when the APDU response Y comprising this result is ready to send.

Step 315 occurs at this end of execution time, by stopping the time counter 130 and thus obtaining the actual processing duration $T_{execution}$ to process the APDU command X.

In step 320, the processing module 110 retrieves, from the estimator 120, the duration $T_{max}$ allocated to the processing of this APDU command X. In one embodiment, this duration defines the time at which the processing module 110 will return the APDU response Y and thus terminate the processing of the APDU command X seen from the outside (that is to say from the host terminal).

Once the duration $T_{max}$ has been retrieved, the processing module 110 compares it with the command execution duration $T_{execution}$. In particular, it determines whether the actual processing duration indicated by the time counter (therefore $T_{execution}$) is less than the predefined duration $T_{max}$ associated with the APDU command, in order to determine whether there is still available processing time $T_{avail}$: $T_{avail} = T_{max} - T_{execution}$.

If not (no time available), the processing module 110 sends the APDU response Y to the host equipment in step 330.

If so (time available), the processing module 110 executes one or more of said elementary operations during the remaining time $T_{avail}$ of said predefined duration $T_{max}$.

In one embodiment in which the main operations are predivided into pluralities of elementary operations by the module 152, the processing module 110 calls on the selector 156 by indicating to it the available duration $T_{avail}$ for the purpose of obtaining the one or more elementary operations to be executed. Mechanisms for selecting the elementary operations are described above with reference to FIG. 2. In particular, the selector 156 selects one or more of said elementary operations to be executed on the basis of their associated elementary processing durations $T_{estim}$ and said time $T_{avail}$ remaining after the execution of the APDU command.

The selection and therefore the subsequent execution may comprise selecting and executing elementary operations originating from distinct main operations.

Step 325 then consists in executing these elementary operations selected and returned by the selector 156.

The time counter 130 may be used here to measure the actual execution duration of each of the elementary operations, in particular for the purpose of adjusting, if necessary, the estimated time $T_{estim}$ for these elementary operations.

It should be noted that if the selector 156 indicates that there is no elementary operation to be executed (either the buffer 154 is empty or no elementary operation at the output of the FIFO buffer satisfies the available duration– $T_{estim} > T_{avail}$), the method may move directly to step 330.

In another embodiment, without prior division of the main operations, step 325 may consist in continuing, during the available time $T_{avail}$, the execution of a previously suspended main operation.

If no main operation has yet been partially executed (and therefore suspended), step 325 consists in starting the execution of a main operation stored in the buffer 140, for example the main operation having the highest priority.

If a main operation has already been partially executed, the step may consist in continuing to execute this main operation from a previous suspension point. The main operation is executed during the available time $T_{avail}$, that is to say it is suspended again at a following suspension point that depends on the remaining time $T_{avail}$. Thus, one or more elementary operations within the main operation will have been executed.

During the suspension, the new suspension point is stored, along with any data or register values needed to resume the execution. Upon this resumption (therefore in a subsequent step 325), the data or values are then restored.

Following step 325 of executing elementary operations, step 330 consists, for the secure element 100, in sending the APDU response Y to the host equipment. It may be seen that this sending follows step 325 of executing the elementary operations. Preferably, the APDU response Y is sent upon expiry of the predefined duration $T_{max}$ associated with the APDU command. By shifting the sending of this response to the end of the duration $T_{max}$, the APDU command execution duration is artificially extended, seen from the outside (host terminal). No other APDU command is thus received from the host terminal during the period $T_{max}$. This ultimately allows the secure element to always be able to execute (gradually) a main operation without blocking APDU command processing, but also without being blocked by a continuous series of APDU commands.

It should be noted that the method of FIG. 3 may be implemented upon receipt of any new APDU command. In this case, the management of the execution of a main operation by the secure element 100 comprises a plurality of iterations of the above steps so as to execute (gradually) the plurality of elementary operations forming the main operation.

Figure 4:
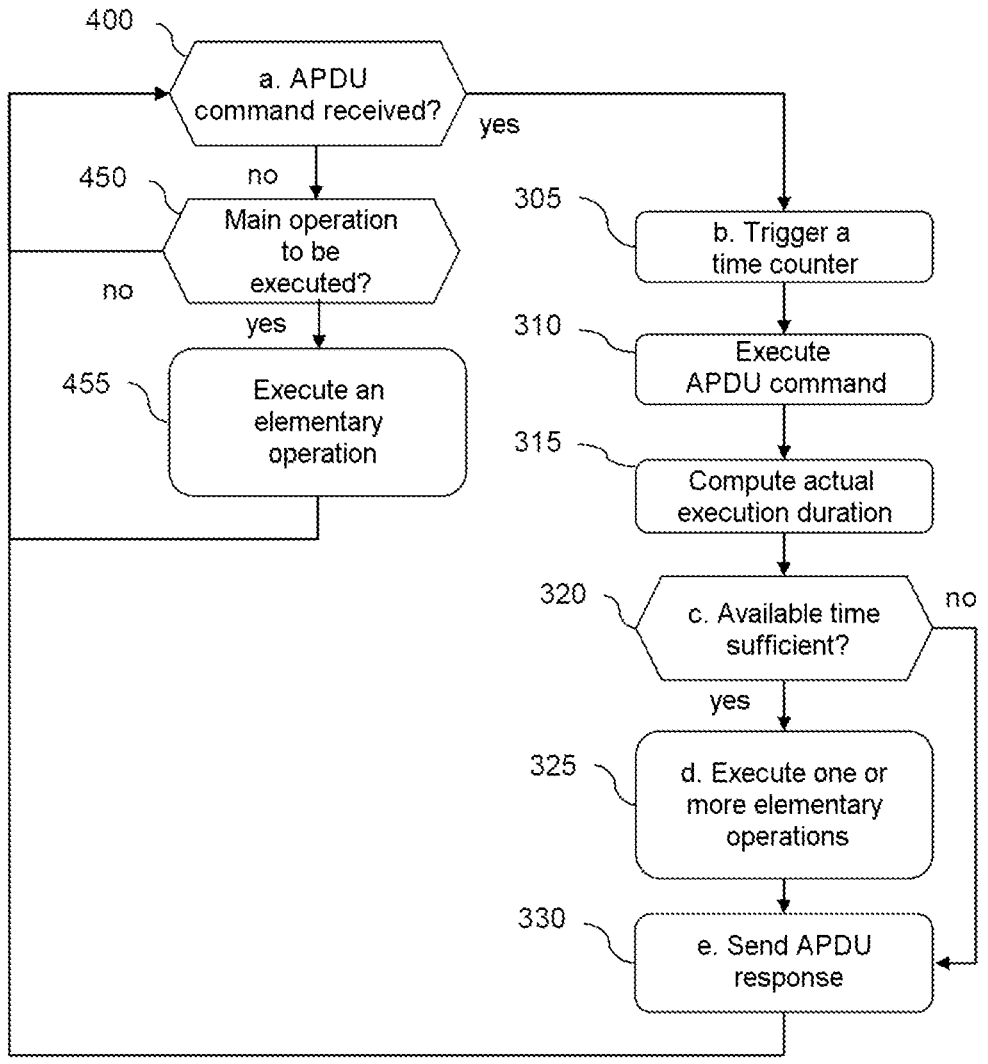
FIG. 4 illustrates, with the aid of a flowchart, general steps of an alternative method according to the invention.

FIG. 4 illustrates, with the aid of a flowchart, another embodiment of a method according to the invention. In this embodiment, one or more elementary operations may be executed between the processing of two APDU commands seen from the host terminal. In other words, the additional execution of one or more of said elementary operations is carried out after the sending of a response to a received APDU command and before the receipt of a following APDU command.

This embodiment also illustrates the successive iterations (via the arrow from step 330 to step 400) of processing received APDU commands in order to gradually execute a main operation.

In step 400, the processing module 110 determines whether an APDU command has been received.

If so, steps 305 to 330 described above are implemented, it being noted that, if there is no main operation to be executed, step 325 is reduced to doing nothing, and the APDU response Y may be transmitted, in step 330, directly after the execution of the command, that is to say without waiting for the end of the allocated duration $T_{max}$. In other words, an extended duration $T_{max}$ is allocated to an APDU command by the estimator 120 only when there are one or more main operations to be executed.

If not, the processing module 110 determines, in step 450, if there is a main operation to be executed, whether or not it has already been partially executed (and therefore suspended). This is tantamount for example to checking whether or not the buffer 140 or 154 is empty.

If not, the method returns to step 400. Therefore, for as long as no APDU command or main operation is received, the processing module 110 performs no processing.

If the test 450 is affirmative, the processing module 110 executes, in step 455, an elementary operation in a manner similar to that described above for step 325 for one or more elementary operations.

If the main operation is divided, step 455 consists in retrieving the first elementary operation from the buffer 154 and in executing it.

In the absence of division, step 455 may consist in resuming the execution of the main operation from the last suspension point and continuing it until the next possible suspension point.

Following this execution, the method returns to step 400. This makes it possible to check whether a new APDU command is received in the meantime.

Of course, step 455 may make provision to execute N (two or more) elementary operations, instead of just one, or to continue the execution until the $N^{th}$ (second or more) next suspension point ahead, before returning to step 400.

If an APDU command is received during the execution 455, the secure element 100 may indicate to the host terminal that it will process the command slightly later.

Those skilled in the art are familiar with the standards for the mechanisms for providing this indication. By way of example, the secure element may return a status (status word) 9300 indicating a busy status. As a variant, it may return a NULL procedure byte (value '60'). As a further variant, it may use the proactive command "MORE TIME" via one or more 91xx/FETCH/MORE TIME/Terminal Response [9000/91xx] sequences.

The secure element may then execute the APDU command after the time extension.

Preferably, the secure element returning this indication as a response to the APDU command waits for the host terminal to return the APDU command again, which command will be taken into account in the next step 400 (without the secure element requesting a new time extension).

The loop of steps 400-450-455 allows the successive execution of one or more elementary operations until a new APDU command is received.

Figure 5:
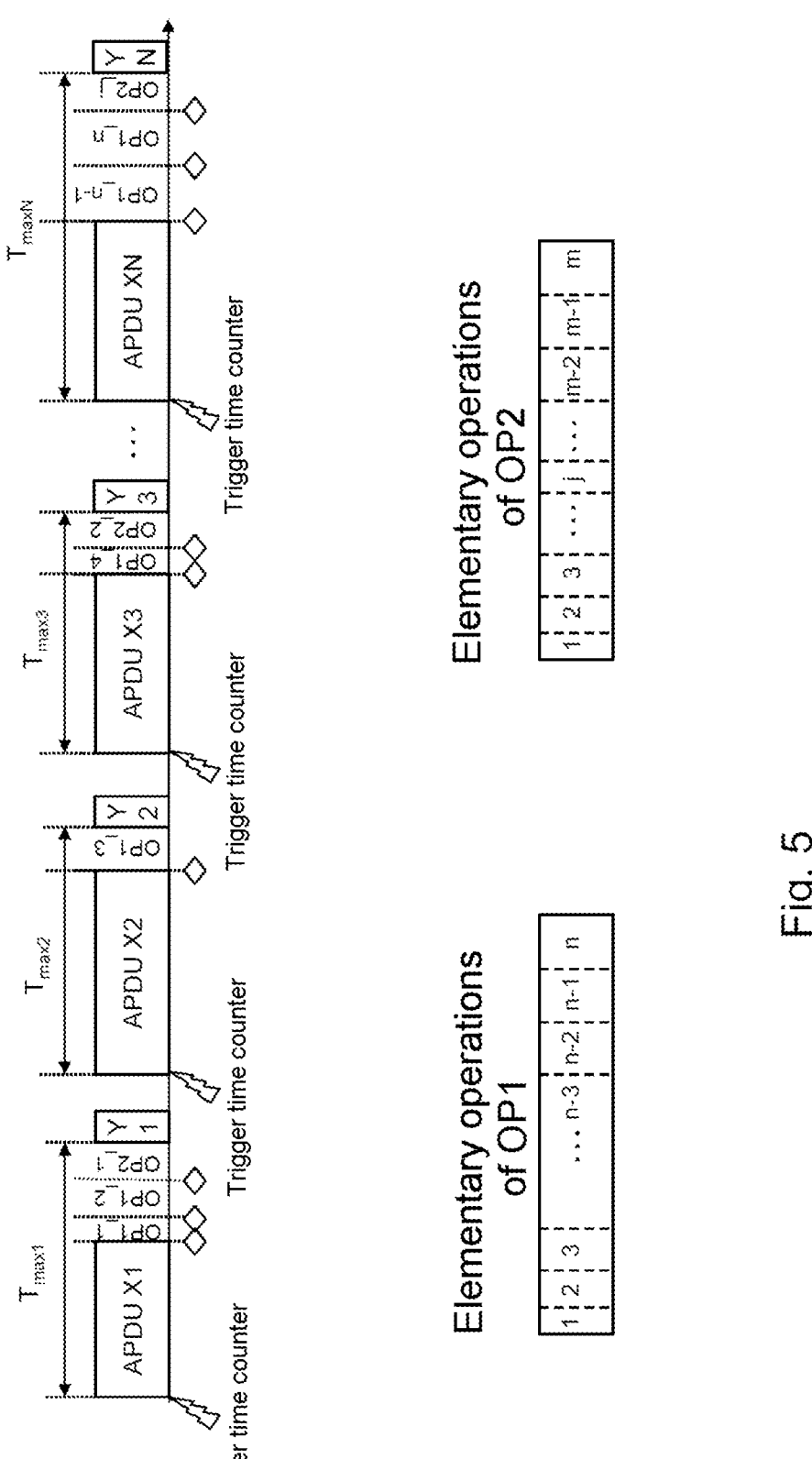
FIG. 5 illustrates a timing diagram of the processing of multiple successive APDU commands while there are main operations to be processed, according to some implementations of the invention.

FIG. 5 illustrates a timing diagram of the processing of multiple successive APDU commands while two main operations OP1 and OP2 are requesting to be processed, for example two identifier ciphers, two garbage collector operations (on two different memory areas) or two operations of different kinds.

Although the two main operations here are to be executed at the same time, one may occur later than the other.

The two main operations OP1 and OP2 are shown at the bottom of the figure as being formed of n and m elementary operations, respectively. These elementary operations are for example stored in two FIFO buffers 154.

Upon receipt of an APDU command X1 (step 300), the secure element 100 obtains the associated time $T_{max1}$, triggers the counter 130 (step 305), executes the APDU command X1 (step 310) without sending the APDU response Y1, and then computes the remaining available time $T_{avail}$ (steps 315, 320). In the example, the available time enables the selector 156 to select elementary operations 1 and 2 of OP1 (OP1_1 and OP1_2) and elementary operation 1 of OP2, denoted OP 2_1 (because for example elementary operation 3 of OP1 requires a time $T_{estim}$ greater than the remaining time).

These three elementary operations are then executed (step 325). Upon expiry of the allocated time $T_{max1}$, the secure element 100 sends the APDU response Y1 to the APDU command X1.

Next, a second APDU command X2 is received (step 300), the secure element 100 obtains the associated time $T_{max2}$, triggers the counter 130 (step 305), executes the APDU command X2 (step 310) without sending the corresponding APDU response Y2, and then computes the remaining available time $T_{avail}$ (steps 315, 320). In the example, the available time $T_{avail}$ enables the selector 156 to select a single elementary operation (elementary operation 3 of OP1, denoted OP1_3). This elementary operation is then executed (step 325). Upon expiry of the allocated time $T_{max2}$, the secure element 100 sends the APDU response Y2 to the APDU command X2.

The same steps are carried out for the APDU command X3 and those that follow. The elementary operations of OP1 and OP2 are thus executed gradually.

The APDU command XN arrives (step 300). The secure element 100 obtains the associated time $T_{maxN}$, triggers the counter 130 (step 305), executes the APDU command XN (step 310) without sending the corresponding APDU response YN, and then computes the remaining available time $T_{avail}$ (steps 315, 320). In the example, the available time $T_{avail}$ enables the selector 156 to select the last two elementary operations of OP1 (OP1_n−1 and OP1_n) and the elementary operation j of OP2, denoted OP2_j. These elementary operations are then executed (step 325). Upon expiry of the allocated time $T_{maxN}$, the secure element 100 sends the APDU response YN to the APDU command XN.

At this stage, the execution of the main operation OP1 is complete since all of its elementary operations have been executed. The result of the main operation may then be used by the secure element. For example, the latter has one or more new encrypted identifiers, or has new recycled memory areas.

Of course, subsequent APDU commands will allow the gradual execution of OP2 to be completed.

The above examples are merely embodiments of the invention.

The invention claimed is:

1. A method for managing the execution of a main operation by a secure element that is integrated into a host equipment, the main operation being formed of a plurality of elementary operations, and the method comprises the following steps:
   a. receiving, from the host equipment, a command in the Application Protocol Data Unit, APDU, format,
   b. triggering a time counter when the APDU command is executed in order to determine an actual processing duration for the secure element to process the APDU command;
   c. determining whether the actual processing duration ($T_{execution}$) indicated by the time counter is less than a predefined duration ($T_{max}$) associated with the APDU command;
   d. in the event of a positive determination, executing one or more of said elementary operations during the remaining time ($T_{avail}$) of said predefined duration; and
   e. sending a response to the APDU command to the host equipment after the executing one or more of said elementary operations during the remaining time ($T_{avail}$) of said predefined duration,
   wherein the main operation is divided into a plurality of elementary operations that are configured to perform one of an encryption operation, a decryption operation, a signature operation, or an operation to clean at least one memory area.

2. The method according to claim 1, wherein the response to the command is sent upon expiry of the predefined duration ($T_{max}$) associated with the APDU command.

3. The method according to claim 1, wherein the time counter is triggered upon receipt of the APDU command.

4. The method according to claim 1, comprising a plurality of iterations of steps a. to d. so as to execute said plurality of elementary operations forming the main operation.

5. The method according to claim 1, comprising, after sending a response to a received APDU command and before receiving a following APDU command, additionally executing one or more of said elementary operations.

6. The method according to claim 5, wherein the additional execution of one or more of said elementary operations comprises successively executing one or more elementary operations until the following APDU command is received.

7. The method according to claim 1, wherein the main operation is predivided into said plurality of elementary operations, each being associated with an elementary processing duration ($T_{estim}$), and
   step d. comprises selecting the one or more of said elementary operations to be executed on the basis of their associated elementary processing durations and said remaining time ($T_{avail}$).

8. The method according to claim 7, wherein step d. comprises executing at least two elementary operations originating from at least two distinct main operations.

9. The method according to claim 1, wherein step d. comprises continuing to execute the main operation from a previous suspension point, said execution of the main operation being suspended at a following suspension point that depends on the remaining time.

10. A secure element configured to be integrated into a host equipment and to execute a main operation formed of a plurality of elementary operations, the secure element comprising a processor configured to:
   a. receive, from the host equipment, a command in the Application Protocol Data Unit, APDU, format,
   b. trigger a time counter when the APDU command is executed in order to determine an actual processing duration for the secure element to process the APDU command;
   c. determine whether the actual processing duration ($T_{execution}$) indicated by the time counter is less than a predefined duration ($T_{max}$) associated with the APDU command;
   d. in the event of a positive determination, execute one or more of said elementary operations during the remaining time ($T_{avail}$) of said predefined duration; and
   e. send a response to the APDU command to the host equipment after the execution of one or more of said elementary operations during the remaining time ($T_{avail}$) of said predefined duration,
   wherein the main operation is divided into a plurality of elementary operations that are configured to perform one of an encryption operation, a decryption operation, a signature operation, or an operation to clean at least one memory area.

11. The non-transient computer-readable medium storing a computer program that, when it is executed by a secure element equipped with a processor and that is integrated into a host equipment, causes the secure element to perform a method for managing the execution of a main operation, the main operation being formed of a plurality of elementary operations, and the method comprises the following steps:
   a. receiving, from the host equipment, a command in the Application Protocol Data Unit, APDU, format, b. triggering a time counter when the APDU command is executed in order to determine an actual processing duration for the secure element to process the APDU command;

c. determining whether the actual processing duration ($T_{execution}$) indicated by the time counter is less than a predefined duration ($T_{max}$) associated with the APDU command;

d. in the event of a positive determination, executing one or more of said elementary operations during the remaining time ($T_{avail}$) of said predefined duration; and e. sending a response to the APDU command to the host equipment after the executing one or more of said elementary operations during the remaining time ($T_{avail}$) of said predefined duration, wherein the main operation is divided into a plurality of elementary operations that are configured to perform one of an encryption operation, a decryption operation, a signature operation, or an operation to clean at least one memory area.

12. The method according to claim 1, wherein the host equipment is a mobile terminal and the secure element is a Subscriber Identity Module (SIM) card configured to be accessed during NFC (Near-Field Communication) communication implemented by the host.

\* \* \* \* \*